United States Patent
Erickson et al.

(10) Patent No.: US 10,691,505 B2
(45) Date of Patent: *Jun. 23, 2020

(54) SOFTWARE BOT CONFLICT-RESOLUTION SERVICE AGENT

(71) Applicant: International Business Machines Corporation, Armonk, NY (US)

(72) Inventors: Thomas D. Erickson, Minneapolis, MN (US); Clifford A. Pickover, Yorktown Heights, NY (US); Komminist Weldemariam, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/251,442

(22) Filed: Jan. 18, 2019

(65) Prior Publication Data

US 2019/0155663 A1    May 23, 2019

Related U.S. Application Data

(63) Continuation of application No. 15/610,736, filed on Jun. 1, 2017, now Pat. No. 10,289,456.

(51) Int. Cl.
*H04L 1/20* (2006.01)
*G06F 9/52* (2006.01)
(Continued)

(52) U.S. Cl.
CPC .............. *G06F 9/52* (2013.01); *G06F 40/166* (2020.01); *G06F 40/216* (2020.01);
(Continued)

(58) Field of Classification Search
CPC ........ G06F 9/52; G06F 17/24; G06F 17/2715; G06F 17/2725; G06F 17/273;
(Continued)

(56) References Cited

U.S. PATENT DOCUMENTS 6,330,588 B1   12/2001  Freeman
7,313,588 B1   12/2007  Shotton, Jr. et al.
(Continued)

FOREIGN PATENT DOCUMENTS

WO     WO02007013 A3    1/2002
WO     WO2015138508 A1  9/2015

OTHER PUBLICATIONS

"The Growing Problem of Bots That Fight Online", Emerging Technology from arXiv, Sep. 20, 2016, pp. 1-7.
(Continued)

*Primary Examiner* — Andy Ho
*Assistant Examiner* — Abdou K Seye
(74) *Attorney, Agent, or Firm* — Scully, Scott, Murphy & Presser, P.C.; Eyal Gilboa (57) ABSTRACT

A bot conflict-resolution service agent (BCRSA) for addressing conflicts between bots in a target domain is disclosed. The BCRSA is configured to receive data from a target domain that includes changes made to a content of the target domain, analyze the data to identify a first change made to the content by a first bot and a second change made to the content by a second bot, determine based on the analysis that the first and second changes conflict, determine that the first and second bots are in conflict, select an amelioration action to be executed to resolve the conflict between the first and second bots from a plurality of available amelioration actions, and resolve the conflict by executing the selected amelioration action.

12 Claims, 7 Drawing Sheets

(51) Int. Cl.
*H04L 9/32* (2006.01)
*G06F 40/166* (2020.01)
*G06F 40/216* (2020.01)
*G06F 40/226* (2020.01)
*G06F 40/232* (2020.01)
*G06F 40/263* (2020.01)
*H04L 9/06* (2006.01)

(52) U.S. Cl.
CPC .......... *G06F 40/226* (2020.01); *G06F 40/232* (2020.01); *G06F 40/263* (2020.01); *H04L 9/3239* (2013.01); *H04L 9/0637* (2013.01); *H04L 2209/38* (2013.01)

(58) Field of Classification Search
CPC ... G06F 17/275; H04L 9/3239; H04L 9/0637; H04L 2209/38
See application file for complete search history.

(56) References Cited

U.S. PATENT DOCUMENTS

| | | | |
|---|---|---|---|
| 8,433,785 | B2 | 4/2013 | Awadallah et al. |
| 8,555,388 | B1 | 10/2013 | Wang et al. |
| 9,438,625 | B1* | 9/2016 | Yang .................. H04L 63/1441 |
| 2011/0016104 | A1* | 1/2011 | Leconte .............. G06F 16/9535 707/706 |
| 2012/0042263 | A1* | 2/2012 | Rapaport ............... G06Q 30/02 715/753 |
| 2012/0204264 | A1 | 8/2012 | Jiang |
| 2014/0283038 | A1* | 9/2014 | Call .................... H04L 63/1441 726/22 |
| 2014/0283068 | A1* | 9/2014 | Call .................... H04L 63/1425 726/23 |
| 2014/0344912 | A1* | 11/2014 | Chapman, II ....... H04L 63/1441 726/11 |
| 2015/0317395 | A1* | 11/2015 | Arkin .................. G06F 16/9535 707/706 |
| 2017/0185981 | A1 | 6/2017 | Emmerson |
| 2017/0293834 | A1 | 10/2017 | Raison et al. |
| 2018/0197172 | A1 | 7/2018 | Coburn et al. |
| 2018/0210891 | A1 | 7/2018 | Oliver et al. |

OTHER PUBLICATIONS

Geiger Stuart, R. et al., When the Levee Breaks: Without Bots, What Happens to Wikipedia's Quality Control Processes?, Aug. 5-7, 2013, pp. 1-6.

Halfaker, A.et al., "Bots and Cyborgs: Wikipedias's Immune System", Mar. 2012, pp. 79-82.

https//en.wikipedia.org/wiki/Wikipedia.Bot_policy, Wikipedia:Bot Policy, printed May 31, 2017, pp. 1-15.

Tsveetkova, M. et al., "Even Good Bots Fight: The Case of Wikipedia", Feb. 23, 2017, pp. 1-27.

Yasseri, T., et al., "Dynamics of Conflicts in Wikipedia", PLoS One, Jun. 2012, pp. 1-12, vol. 7, Issue 6.

List of IBM Patents or Patent Applications Treated as Related, dated Jan. 18, 2019, 2 pages.

* cited by examiner

FIG. 7

SOFTWARE BOT CONFLICT-RESOLUTION SERVICE AGENT

BACKGROUND

The present disclosure relates to software agents, commonly known as bots. Bots, also known as web robots, WWW robots, or simply bots, are software applications that are created to autonomously perform tasks, e.g., scripts, over the internet. Bots are often created to perform tasks that are simple and structurally repetitive so as to alleviate the burden on humans for performing these functions. Some examples of bots may include web crawlers, chat bots that are configured to answer user questions, bots that are configured to correct information, spelling, or other materials on web pages, e.g., on Wikipedia®, anti-vandalism bots, censoring and moderating bots on chats and forums, bots that create alerts or provide content aggregation, e.g., on Twitter®, customer service bots, artificial intelligence bots, e.g., IBM Watson®, or bots that may perform any other function. In some aspects, for example, bots may identify and undo vandalism, enforce bans, check spelling, create inter-language links, import content automatically, mine data, identify copyright violations, greet newcomers, and so on.

BRIEF SUMMARY

A bot conflict-resolution service agent (BCRSA) is disclosed that is configured to take an amelioration action in response to a detection of a conflict between software bots.

In an aspect of the present disclosure, a method implemented by a bot conflict-resolution service agent (BCRSA) is disclosed. The method includes receiving, by the BCRSA, data from a target domain. The data includes changes made to a content of the target domain. The method further includes analyzing, by the BCRSA, the data to identify a first change made to the content by a first bot and a second change made to the content by a second bot, determining, by the BCRSA, based on the analysis that the first and second changes conflict, in response to determining that the first and second changes conflict, determining, by the BCRSA, that the first and second bots are in conflict, in response to determining that the first and second bots are in conflict, selecting, by the BCRSA, an amelioration action to be executed to resolve the conflict between the first and second bots from a plurality of available amelioration actions, and resolving, by the BCRSA, the conflict by executing the selected amelioration action.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

A bot conflict-resolution service agent (BCRSA) is disclosed that is configured to take an amelioration action in response to a detection of a conflict between software bots. For example, bots that are used to monitor changes to the content of an online web page, e.g., a web page having content that is separately modifiable by both users and bots, and may be configured to make changes to the content according to rules, parameters, or requirements specific to each bot. When each bot has different rules, parameters, or requirements for how the content should be modified or maintained, conflicts between the bots may arise. For example, the bots may repeatedly and unproductively undo or revert one another's edits or other actions due to the conflicting rules, parameters, or requirements.

As an example, a British spelling correction bot may include rules, parameters, or requirements to change the string "color" in the content of a web page or document to the string "colour". An American spelling correction bot, on the other hand, may include rules, parameters, or requirements to change the string "colour" in the content of a web page or document to the string "color." While each of these bots may have been created with good intentions, e.g., the British spelling correction bot was created to ensure that spelling in the content is correct according to the English language spoken in the United Kingdom while the American spelling correction bot was created to ensure that spelling in the content is correct according to English language spoken in the United States of America, the end result is a conflict between the two bots that may result in continuous, unnecessary, and unintended modifications and reversions of the content of the web page by the bots between British English and American English spellings.

Figure 1:
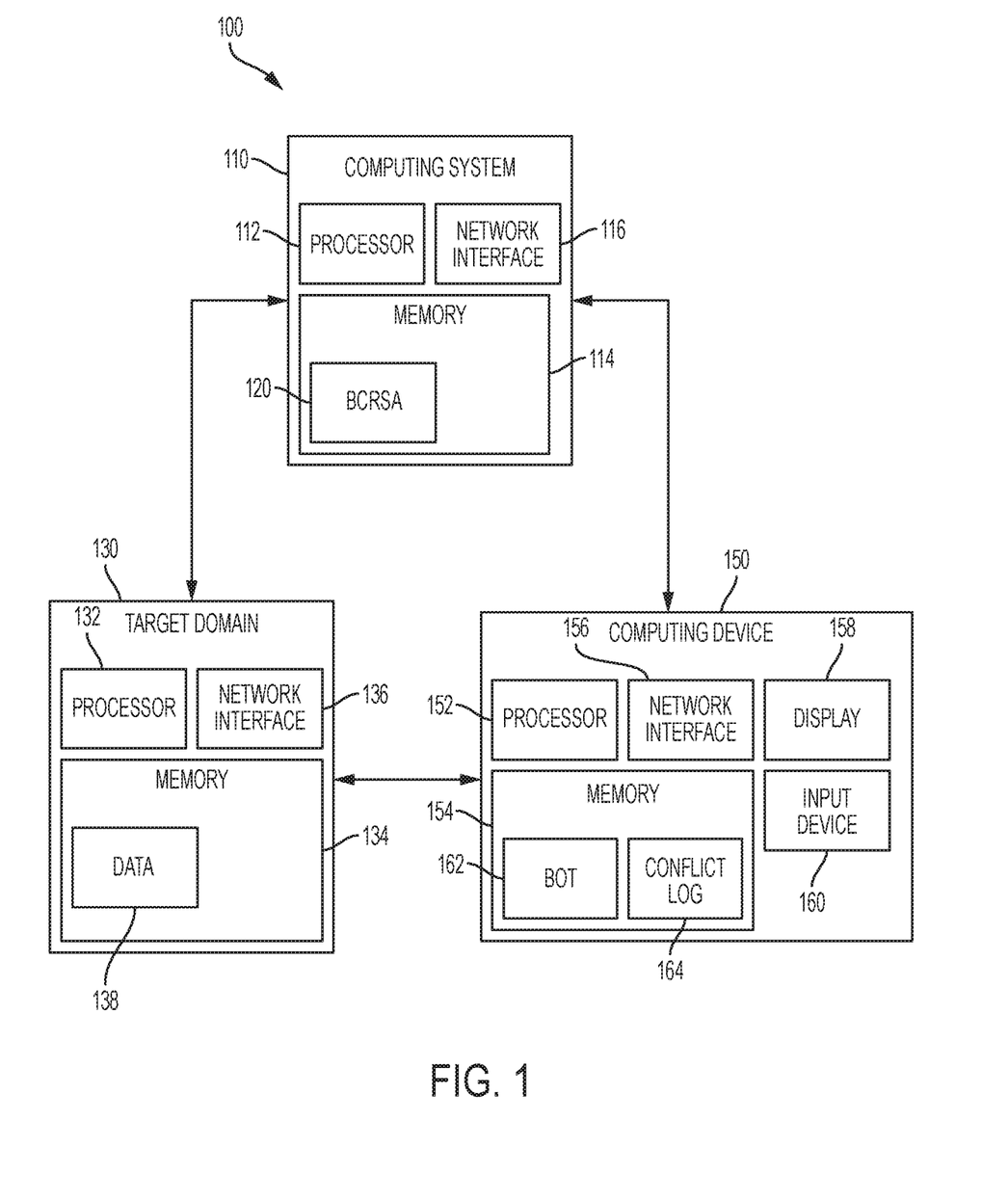
FIG. 1 is a system diagram illustrating a system resolving conflicts between bots in accordance with an aspect of the present disclosure.
Figure 2:
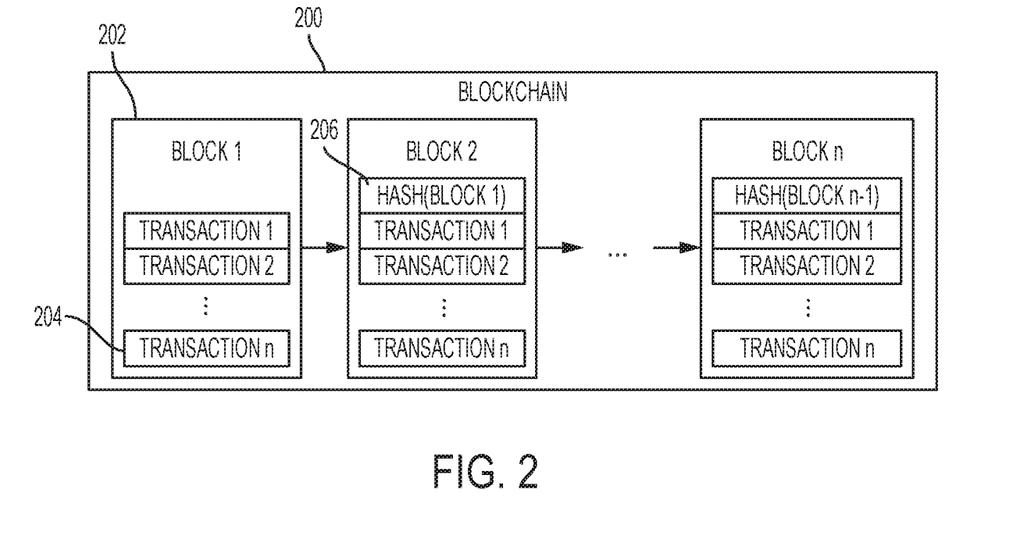
FIG. 2 is a system diagram illustrating a blockchain in accordance with an aspect of the present disclosure.
Figure 3:
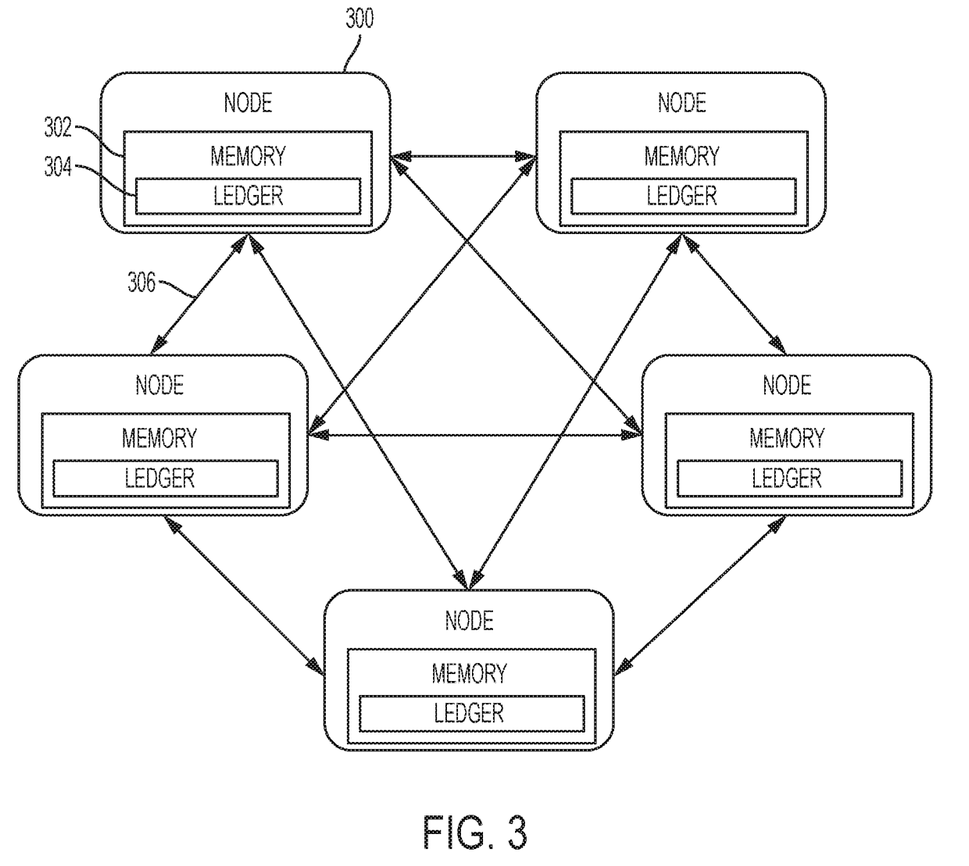
FIG. 3 is a system diagram illustrating nodes associated with the blockchain of FIG. 2 and storing the ledger of the blockchain of FIG. 2 in accordance with an aspect of the present disclosure.
Figure 4:
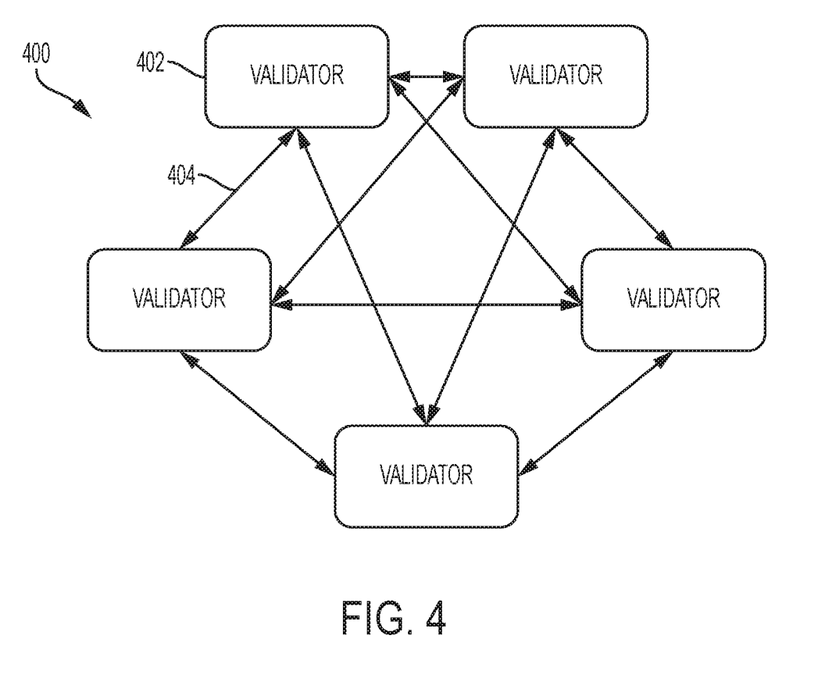
FIG. 4 is a system diagram illustrating validator nodes associated with the blockchain of FIG. 2 in accordance with an aspect of the present disclosure

With reference now to FIG. 1, a system 100 for addressing conflicts between bots in a target domain is illustrated. In some aspects, system 100 includes a computing system 110, a target domain 130, and a computing device 150. Computing system 110 may include one or more computing devices, servers, nodes, gateways, or any other component that may implement the BCRSA functionality for detecting and ameliorating conflicts between bots in a target domain. In some aspects, computing system 110 may include or be associated with a blockchain for tracking and storing actions, rules, or other parameters taken or implemented by the BCRSA. An example blockchain is illustrated in FIGS. 2-4.

Computing system 110 includes at least one processor 112, memory 114, at least one network interface 116, and may include any other features commonly found in a computing device or more than one computing device in a system.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In some aspects, for example, the BCRSA, instructions implementing the BCRSA, software implementing the BCRSA, an application implementing the BCRSA, or any other functionality for implementing the BCRSA may be stored in memory 114 as BCRSA 120. For example BCRSA 120 may be a software application that is executable by processor 112 to detect, manage, and ameliorate conflicts between bots on the target domain 130.

Network interface 116 is configured to transmit and receive data or information to and from a target domain 130, computing device 150, or any other computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing system 110 to transmit or receive information to or from target domain 130 or computing device 150 or any other device or system.

Target domain 130 includes at least one processor 132, memory 134, and a network interface 136 that may include similar functionality as processor 112, memory 114, and network interface 116. In some aspects, target domain 130 may, for example, be one or more computing devices associated with a web site, web portal, web service, web server, database, server, or any other computing devices that may contain data 138 that may be modified or manipulated by bots. In some aspects, data 138 may include content that is presented to users of the target domain 130, e.g., articles, words, pictures, links, or any other content. In some aspects, for example, target domain 130 may include a web site that provides a platform for users of the web site to collaboratively update and present information or other data for consumption such as, e.g., Wikipedia® owned by Wikimedia Foundation, Inc. of California.

Computing device 150 includes at least one processor 152, memory 154, at least one network interface 156, a display 158, an input device 160, and may include any other features commonly found in a computing device. In some aspects, processor 152, memory 154, network interface 156 may include similar functionality as processor 112, memory 114, and network interface 116. In some aspects, computing device 150 may, for example, be a computing device associated with a user or owner of a bot. In some aspects, computing device 150 may include, for example, a personal computer, laptop, tablet, smart device, smart phone, smart watch, or any other similar computing device that may be used by a user. In some aspects, for example, one or more bots 162 may be stored in memory 154 for execution by processor 152. Bots 162 may include software programs or agents of a user of computing device 150 that are configured to autonomously analyze the data 138 on the target domain 130 and perform actions on the data 138, e.g., modifications, corrections, additions, deletions, etc., based on a set of rules, parameters, or requirements defined for the bot 162 by the user. In some aspects, bots 162 may reside remotely from the user, e.g., in memory of a server or other system and may be remotely activated by the user via computing device 150, e.g., using network interface 156.

Display 158 may include any display device that is configured to display information to a user of computing device 150. For example, in some aspects, display 158 may include a computer monitor, television, smart television, or other similar displays. In some aspects, display 158 may be integrated into or associated with computing device 150, for example, as a display of a laptop, smart phone, smart watch, or other smart wearable devices, as a virtual reality headset associated with computing device 150, or any other mechanism for displaying information to a user. In some aspects, display 158 may include, for example, a liquid crystal display (LCD), an e-paper/e-ink display, an organic LED (OLED) display, or other similar display technologies. In some aspects, display 158 may be touch-sensitive and may also function as an input device 160.

Input device 160 may include, for example, a keyboard, a mouse, a touch-sensitive display 158, a keypad, a microphone, or other similar input devices or any other input devices that may be used alone or together to provide a user with the capability to interact with computing device 150.

In some aspects, conflicts may be detected by monitoring the actions of the bots 162 for fingerprints of a conflict in the target domain 130. For example, conflicts may be detected by analyzing the behavior of the bots from historical interaction data stored on a database, by analyzing evidence received from other bots based on their current and past interactions, or other similar analysis. In some aspects, for example, the detection of conflict between bots may include receiving a first set of bot data (e.g., bot profile, instrumented related to the bot activities data, application metadata, bots' interaction data, human-user reports, etc.), estimating the behavior of a bot based on the first set of bot data, identifying conflict factors in the first set of bot data, determining a plurality of available conflict management models (e.g., a collection of machine learning and/or statistical models trained based on historical data) based on the estimated behavior of the bot, the first set of bot data, and the conflict factors, and detecting a conflict (or set of conflicts) based on the plurality of available conflict management models and the first set of bot data.

In some aspects, for example, a rapid change in the data 138 between two or more states, such as the spelling of the same word or words as described above, may be detected by BCRSA 120 and determined to be an indication that a conflict between two bots 162 is present. In some aspects, for example, the latency or mean log time in seconds between successive reverts may be used to determine whether there is a conflict between bots 162. In some aspects, for example, balanced reverts between a change I and a change J may indicate that there is a conflict between bots 162. For example, when change I is reverted to change J 500 times, and change J is reverted to change I 500 times, the reverts may be determined to be in balance, e.g., within a certain threshold difference in the number of reverts, which may indicate that bots 162 are performing the reverts. For example the threshold difference may be any differential between the number of reverts from I to J and J to I, e.g., +−5 reverts or other similar differentials. In some aspects, if the differential in the number of reverts is greater than a predetermined threshold, e.g., greater than +−10 or some percentage of the number of reverts, the reverts may be determined to be unbalanced which may indicate that the reverts are not performed by bots 162.

In another example, reciprocity may be used to determine a conflict between bots. For example, the proportion of observed turning points out of all possible: (# turning points)/(ri+rj−1), where ri and rj are the number of times i reverted j and j reverted i, respectively. A turning point occurs when the user, e.g., bot, who reverts at time t is different from the user, e.g., bot, who reverts at time t+1.

In some aspects, the BCRSA 120 may select and prioritize a set of amelioration actions corresponding to the detected set of conflicts and then apply the set of amelioration actions to resolve the detected conflict. It is important to note that human users of target domain 130 may often disagree over the spelling, content, or other data 138 presented on the target domain 130 with respect to a particular topic. The users may make modifications or reversions to the data 138 based on these disagreements in the normal course of usage. In some aspects, however, the speed, timing, or nature in which bots 162 may make the same changes to the data 138 of the target domain 130 may be used to determine that bots 162 are responsible for the changes.

In some aspects, the amelioration action or actions taken by the BCRSA 120 in response to detecting a conflict between bots 162 may include, for example, determining a final action (a final spelling of the work "color" for example), transmitting a message to the owners, users, or software designers of the bots 162 in conflict with an indication that there is a conflict, e.g., via network interfaces 116 and 156, colorizing or highlighting the string or other portion of data 138 that is in conflict, locking the data 138 in conflict so that the conflicted bots 162 may no longer make changes, performing modifications or reversions to the data 138 in conflict, making an alternate change to the data 138 in conflict that eliminates the conflict, transmitting or issuing a "cease and desist" order or message to the bots 162 in conflict, activating a feature of the BCRSA 120 for receiving explanations from the bots 162 and transmitting a request to the network interface 156 associated with each bot 162 in the conflict for an explanation, taking an action based on the explanations received by network interface 116 from the computing device 150 associated with the bots 162 in conflict (e.g., allowing the execution of the rules, parameters, or requirements of one of the bots 162 while preventing the execution of the rules, parameters, or requirements of the other bots 162 with respect to the content in conflict), analyzing entries in a bot-resolution table to determine an action to take (e.g., a bot resolution table stored in memory 114), requiring a bot slow-down or disablement, alert third parties of the conflict (e.g., a web site moderator or administrator, an arbitrator, etc.), placing icons of bots 162 on an electronic calendar associated with a user (e.g., web site or service administrator, bot owner, a creator of the content, a subscriber of the content, etc.) at times of peak or suspicious activity, and quarantining a conflicting bot 162 in a virtual holding pen and presenting the quarantined bot 162 as an icon of a bot within a fence, for example, to a web site or service administrator, bot owner, a creator of the content and a subscriber of the content, e.g., via display 158. In some aspects, some or all of the above amelioration actions may be performed automatically by BCRSA 120 without further user input.

In some aspects, for example, the BCRSA 120 may be based on blockchain technology. For example, any actions, activities, operations, rules, decisions, or other similar aspects of the BCRSA 120 may be tracked and securely stored on a blockchain to provide owners of bots 162 with an assurance that the BCRSA 120 is acting without malicious interference. In some aspects, transactions related to a bot are generated from bot activities. Transaction generation may include, for example, adding, modifying, updating or performing other functions on text, documents, or other data, logging bot-to-bot conversation/interactions, tracking a state of a bot, or capturing any other interaction event associated with the bot activity such as a bot posting a comment, feedback or question, submitting or completing a task, etc. In some aspects, the blockchain may also include transactions based on various customizable parameters related to bot actions. For example, in some aspects, the transactions may include a chronicle of conflict declaration information of a bot through the "life" of the bot record (or for a period of time), a chronicle of activities of a bot through the "life" of the bot (or for a period of time), or other similar information. In some aspects, the transactions may include, for example, one or more actions performed by a bot when interacting with other bots, bot-content specific events such as text/document/data metadata generated or updated with respect to the bot action taken, time spent per action, number of updates/edits, number of attempts (e.g. the bots may repeatedly and unproductively undo or revert one another's edits or other actions due to the conflicting rules, parameters, or requirements) along with timestamp, etc.

With reference now to FIGS. 2-4, blockchain technology was developed as a way of providing a publicly transparent and decentralized ledger that is configured to track and store digital transactions in a publicly verifiable, secure, and hardened manner to prevent tampering or revision.

A typical blockchain includes three primary functions: read, write, and validate. For example, a user of the blockchain must have the ability to read the data that resides on the blockchain. A user of the blockchain must also have the ability to write, e.g. append, data to the blockchain. Every write operation starts out as a proposed transaction that is posted on the network. The proposed transaction may not always be valid, for example, it may be malformed (syntax errors), or it may constitute an attempt to perform a task for which the submitter is not authorized. Validation refers to filtering out invalid transactions and then deciding on the exact order for the remaining, valid, transactions to be appended to the blockchain as part of a new block.

Once ordered, the transactions are packaged into a new block, and the new block is voted on by the validator nodes associated with the blockchain to determine whether to add the new block to the blockchain. If a consensus to add the new block is reached, e.g., a threshold number of "for" votes, the new block may be appended to the blockchain. Each new block that is appended to the blockchain also includes a hash of the previous block. Accordingly, as each new block is added, the security and integrity of the entire blockchain is further enhanced. It is important to note that once data is written to the blockchain, for example, once a block including a set of transactions has been appended to the blockchain, that data can no longer be altered or modified. In a typical blockchain, the anonymity of the users is protected through the use of pseudonyms and the transaction data itself is protected through the use of cryptography, e.g., via the use of hash codes.

With reference now to FIG. 2, an example blockchain 200 includes a plurality of data blocks 202. Each data block 202 is a data structure that includes data representing transactions 204, for example, actions, activities, operations, rules, decisions, or other similar aspects of the BCRSA 120, or of bots 162. As described above, as new transactions 204 are submitted to the blockchain 200 and validated by validator nodes, additional data blocks 202 are generated by the validator nodes and appended to the blockchain 200. Each new data block 202 includes a set of validated transactions 204 and a hash 206 of the content of the immediately previous data block 202. For example, data block "2" includes a hash of the content of block "1", block "n" includes a hash of the content of block "n−1", etc. Some non-limiting examples of blockchains include Bitcoin®, Ethereum®, OpenLedger™, or other similar blockchains.

With reference now to FIGS. 2 and 3, in some aspects, blockchain 200 is stored in a decentralized manner on a plurality of nodes 300, e.g., computing devices located in one or more networks. Nodes 300 may each include a memory 302 that stores at least a portion of a ledger 304 of blockchain 200. Ledger 304 includes any data blocks 202 that have been validated and added to the blockchain 200. In some aspects, every node 300 may store the entire ledger 304. In some aspects, each node 300 may store a portion of ledger 304. In some aspects, some or all of blockchain 200 may be stored in a centralized manner. Nodes 300 may communicate with one another via communication pathways 306, e.g., wired or wireless connections, over the internet, etc. to transmit and receive data related to ledger 304. For example, as new data blocks 202 are added to ledger 304, nodes 300 may communicate or share the new data blocks 202 via communication pathways 306. In some aspects, some or all of nodes 300 may be operated by a single entity, e.g., computing system 100, the target domain 130, or any other entity. In some aspects, some or all of nodes 300 may be operated by a known group of entities, e.g., the owners of the bots 162 operating on the target domain 130, a conglomerate of entities operating the target domain 130, or any other known group. In some aspects, the operators of some or all of nodes 300 may be anonymous and unrelated to each, computing system 100, or the target domain 130.

With reference now to FIGS. 2-4, any transactions 204 submitted to blockchain 200 are validated by a set of validator nodes 400 associated with blockchain 200. For example, transactions 204 may be transmitted to one or more of the validator nodes 400 and may be shared between the validator nodes 400 for validation and consensus. Each validator node 402 determines whether a transaction 204 is valid and whether the transaction 204 complies with the rules of the blockchain 200. The validator node 402 adds a plurality of the validated transactions 204 to a data block 202 and submits the data block 202 for consensus by all or some of the other validator nodes 402. The other validator nodes 402 then vote "for" or "against" appending the data block 202 containing the transactions 204 to the blockchain 200. A consensus of the set of validator nodes 400, e.g., a threshold number of identical votes "for" or "against", is required to allow or deny the data block 202 to be appended to the blockchain 200. In some aspects, one or more of nodes 300 may also be validator nodes 402. In some aspects, nodes 300 that are not validator nodes 402 may perform processing such as, for example, receiving transaction submissions, providing member services, handling application programming interface (API) requests from users, or other similar functions. In this manner, the processing power of the validator nodes 402 may be preserved for generating new blocks, reaching consensus, and monitoring the other validator nodes 402. Validator nodes 402 may communicate with one another via communication pathways 404, e.g., wired or wireless connections, over the internet, etc., to transmit and receive data. For example, as new data blocks 202 are generated by validator nodes 402, validator nodes 402 may communicate or share the new data blocks 202 and transmit and receive consensus messages via communication pathways 404. some or all of validator nodes 400 may be operated by a single entity, e.g., computing system 100, the target domain 130, or any other entity. In some aspects, some or all of validator nodes 400 may be operated by a known group of entities, e.g., the owners of the bots 162 operating on the target domain 130, a conglomerate of entities operating the target domain 130, or any other known group. In some aspects, the operators of some or all of validator nodes 400 may be anonymous and unrelated to each, computing system 100, or the target domain 130.

Referring now to FIGS. 1-4, in some aspects, for example, BCRSA 120 may authorize the bots 162 to perform specific action in the target domain 130, e.g., editing, deleting, modifying, etc., by entering the authorization as a new transaction 204 for submission to the blockchain 200. For example, an graphical user interface (GUI) or a command and control (C&C) interface may be presented to a user of a bots 162, e.g., via display 158 of computing device 150, that provides the user with the capability to register the bot 162 with BCRSA 120 directly or on the blockchain 200. For example, the user may submit a registration transaction for each bot 162 to BCRSA 120 directly or to the blockchain 200 for addition to the next block to be verified by the blockchain 200. The validator nodes 400 associated with the blockchain 200 may validate the block containing the transaction for addition to the blockchain. In some aspects, the user of each bot 162 may be required to declare any conflicts of interest among other bots 162 that are already registered with the BCRSA 120 on the blockchain 200 and the BCRSA 120 may automatically generate smart contract transactions, e.g., as workflows, to be added to the blockchain 200 that manage or define the parameters for cooperation and collaboration among the bots 162 that are in conflict. In some aspects, the BCRSA may use a dynamic smart contract generator to iteratively translate a specification of conflict declaration (e.g., a set of rules or requirements for determining when there is a conflict) into a smart contract implementation language construct (e.g., translates the set of rules into a particular programming language or type of chaincode). In some aspects, for example, a smart contract editor that generates the specification of conflict declaration (e.g. in XML, JSON, graphical based, or other similar formats) may be executed. In some aspects, for example, the generator may take a specification of conflict declaration for a smart contract and may automatically converts the specification into code that may be executed by nodes 300 or 400 associated with a blockchain.

For example, a smart contract may be a transaction 204 defining a self-executing and binding agreement of the rules, terms, parameters or other similar features under which the new bot 162 will operate.

In some aspects, for example, the BCRSA 120 may directly control the permissions of the bots 162 to modify text, content, or other data 138 in the target domain 130. For example, bots 162 may be permitted to modify text or other data in the target domain 130 only when the BCRSA 120 authorizes the bots 162 to perform these actions. In some aspects, the authorization may be submitted by BCRSA 120 as a transaction 204 for addition to blockchain 200. For example, a user may submit a request for authorization for a bot 162 using computing device 150 to BCRSA 120 and BCRSA 120 may respond to the request by submitting a transaction including an authorization for the bot 162 to perform specified actions in the target domain 130 for addition to blockchain 200.

In some aspects, for example, the BCRSA 120 may generate temporary keys that may be provided to bots 162 to allow the bots 162 to perform actions on the text, documents, or other data 138 of the target domain 130. For example, the generation and distribution of keys by BCRSA 120 may be managed using a federated identity and key management system (e.g., an instance or dedicated Cryptographic Certificate Authority or token-based identity/key management service). In some aspects, for example, an access control with a temporal constraint may be defined for each action that may be taken on content (i.e., on text, documents, or other data 138 of the target domain 130). In some aspects, for example, each time a bot is about to perform an action or transaction on a content, the bot may be required to pass a key/token and identity along with the action specific metadata. The validity of the key/token and identity may be verified by nodes 300 or 400 associated with the blockchain to confirm that the bot is authorized to take the action. In some aspects, for example, the temporal aspect of a key may be encoded in the workflows (e.g., smart contracts) to control and manage the granting and revoking of the key in a transparent and efficient way.

In some aspects, for example, the BCRSA 120 may employ a set of rules (e.g., allowed actions on text, documents, or other data) and risk factors to determine which amelioration action to take. For example, in some aspects, the rules of the BCRSA 120 may be encoded as transactions 204 in the blocks 202 of the blockchain 200 so that all bots 162 associated with the BCRSA 120 may have confirmable knowledge of the rules. In some aspects, for example, risk factors may include consistency, reliability (e.g., in terms of semantics) or other similar properties of a text, file, log, or document. In some aspects, for example, risk factors may include a security level of a text, file, log, or document regarding a potential vulnerability, compliance violation, relation to business values, or other similar security criteria. In some aspects, encoding the rules as transactions 204 in the blocks 202 of the blockchain 200 may also inhibit malicious actors or event benign bots 162 with buggy or vulnerable code from attempting to change, modify, replace, or delete the rules of the BCRSA 120. In some aspects, for example, the risk factors of the BCRSA may also be encoded as transactions in the blocks of the blockchain in a similar manner to the rules. In some aspects, the risk factors may be learned based on historic bot action transactions found in the blocks of the blockchain.

Figure 5:
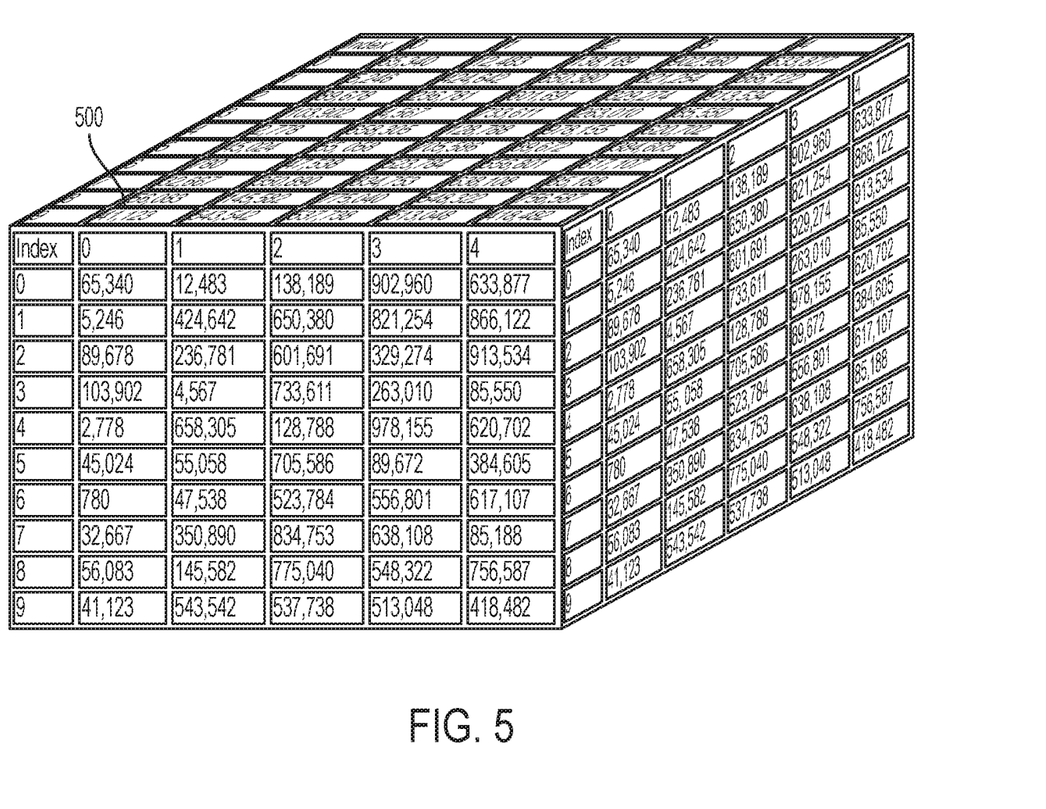
FIG. 5 is an illustration of a high dimensional array in accordance with an aspect of the present disclosure.

In some aspects, with reference to FIG. 5, a high-dimensional (HD) array 500 specifying bot-resolution rules and risks may be employed for aiding BCRSA 120 in determining a resolution to a conflict. In some aspects, for example, the HD array 500 may include trust ratings for each bot 162, bot history flags, crowd-sourced ratings, or other similar data about each bot, about various bot conflicts, historical conflicts, potential resolutions, or any other data or information that may be used to assist BCRSA 120 in determining an action to take in response to the detection of a conflict. In some aspects, for example, a dimension of the multidimensional risk array may include information related to content risk factors (e.g., consistency, reliability, etc. of a text, file, log, or document, the security level of a text, file, log, or document regarding a potential vulnerability, compliance violation, etc.). In some aspects, for example, another dimension may include an actions severity index (e.g. delete, modify, add, revert, undo, etc.). In some aspects, for example, another dimension may represent a risk of sequences of two or more bot-to-bot interactions in more than one geographic area. In some aspects, for example, another dimension may include transactions and content (e.g. text, document, files, data, etc) already affected and other content that may be linked with the content already affected. In some aspects, for example, another dimension may include whether a change or series of changes are from a bot's single action or from a network of bots performing the action or exhibiting the suspicious conflicting behavior. In some aspects, for example, another dimension may include a destruction level caused by the bot or group of bots actions in addition to the actual conflict causing actions being taken or of predicted intent of a bot. In some aspects, for example, another dimension may include a rating for each bot.

In some aspects, for example, the BCRSA 120 may determine ratings for bots 162 that take actions on the target domain 130. For example, a history of actions performed by the bot 162 in the target domain 130 may be tracked and used to determine a rating for the bot 162. For example, if a large portion of the bot's actions are accepted and not reverted, the bot 162 may enjoy a high rating, e.g., a rating of 80% or 0.80. In some aspects, for example, the determined ratings BCRSA 120 may be used to weight possible actions to be taken by the BCRSA 120 when a conflict between two bots 162 is detected. For example, a first bot having a higher rating than a second bot, e.g., based on historical performance of the bots, may receive preferential treatment by BCRSA 120. In some aspects, for example, historical bot actions and characteristics may be utilized to determine that the rating of the bot. For example, the risk of the bot might be higher on a particular context (e.g., at times of peak or suspicious activity day, week, or month) based on different activities or events previously performed by the bot. For example, inputs for the risk array may be dynamic and may change or be updated (even significantly) over time. In some aspects, for example, computing system 110 may estimate the conflict level of each activity of a bot. In some aspects, for example, the rating of the bot may be used to estimate where a conflicting activity might be performed by the bot in the future. For example, the estimate may be based on a common revert/undo pattern between subsequent edit events in a particular location of a content in the target domain 130. In some aspects, for example, computing device 110 may automatically consider transactions performed by a bot so far, e.g., historical transactions, and may predict the likelihood of the next action performed by the bot having a high risk level.

In some aspects, for example, computing system 110 may utilize supervised or unsupervised learning techniques for detecting sequences of events (e.g., edit→edit→undo→edit→undo→undo of a text on the same location between a first time and a second time), e.g. in Wikipedia®. The detected sequence of events may have predicted time, date, and possible conflicting areas of the content, and may estimate a total number of affected users based on a plurality of historic conflict logs.

In some aspects, each bot 162 have an associated conflict log 164 that stores information about each conflict that has occurred for the bot 162. In some aspects, the conflict log 164 may be stored as part of bot 162. In some aspects, the conflict log 164 may be stored separately from bot 162 in memory 154. In some aspects, computing system 110 may track and store conflict logs 164 for each bot 162 that is performing actions in the target domain 130 and may provide the stored conflict log 164 to a user of computing device 150 that owns bot 162 as part of a service offering. The user may then study the conflict log 164 to determine what conflicts the bot 162 has encountered.

In some aspects, the stored conflict logs 164 may be compared with declared conflicts on the blockchain 200 to determine whether the bot 162 is in compliance with the stated conflicts and whether a new conflict for the bot 162 has occurred that may need to be added to blockchain 200. In some aspects, a standard interface for reviewing conflict logs 164 may be implemented that allows an owner of the bot 162 or user of BCRSA 120 to review the conflict logs 164 stored on blockchain 200. In some aspects, for example, the graphical user interface (GUI) may provide analytics data based on the conflict logs 164 to stakeholders of the target domain 130, e.g., users or operators of target domain 130, based on the conflict log data stored on blockchain 200. In some aspects, for example, the generation of the analytics data may be based on a standardized process in machine learning or statistical modeling techniques and algorithms. For example, to generate the analytics models, the BCRSA 120 may receive a first set of conflict logs from a database (e.g. historic bot conflict blockchain logs), identify conflict factors in the first set of conflict logs, and determine a plurality of conflict models using machine learning and/or statistical algorithms (e.g., regression models) based on the identified conflict factors and the first set of conflict logs.

In some aspects, computing system 110 may allow a user to analyze all conflicts within a particular target domain 130, e.g., Wikipedia®, to identify bots 162 that are particularly troublesome, e.g., cause a large amount of damage to the data 138 of the target domain 130. Computing system 110 and BCRSA 120 may escalate responses to those bots 162, e.g., banning, revoking authorization, limiting actions, etc., or provide the identity of their sources or owners to interested third parties that may then contact those sources or owners to provide feedback on the bots 162 in an attempt to modify the bots actions. For example, where a bot 162 is performing actions that were not intended by the source or owner, the owner may be notified of the conflicts caused by the bot 162 and be given an opportunity to modify the bot 162 to no longer cause the conflict. In some aspects, for example, failure to modify the actions of the bot 162 may result in BCRSA 120 revoking authorization to the bot 162 to perform actions in the target domain 130. The analysis of all of the conflicts within the target domain 130 may provide these owners with a suitable amount of troubleshooting data that may be used to resolve the conflicts caused by their bots 162. In some aspects, blockchain 200 may be taken advantage of to reinforce democratic resolution of conflicts and damages. For example, when a new bot 162 is introduced to BCRSA 120, BCRSA 120 may requires the registration of bot 162, a declaration of any existing conflicts for the bot 162, a declaration of all tasks or activities that the bot 162 intends to perform, and other similar aspects of the bot 162 which may all be added to the blockchain 200 as a registration transaction or in separate transactions.

In some aspects, BCRSA 120 may employ one or more specialized analytics techniques such as, e.g., deep-learning, natural language processing (NLP), or other similar analytics techniques to detect hidden or subtle changes in data 138 of the target domain 130, e.g., font/color/formatting of the content in the data 138, changes to multimedia, images, audio, video, attachments, or other similar changes that may not be easily identifiable or obvious to a human user of the target domain 130. For example, if two bots 162 are in conflict over formatting in a document such as the color of links, number of spaces after a period, or other similar stylistic rules, a typical human user of the target domain 130 may not even notice. In some aspects, for example, the detection and amelioration of these conflicts between bots 162 by BCRSA 120 may increase efficiency and reduce network and system processing on the target domain 130. For example, since the continuous modifications and reverts by bots 162 may bog down system resources of the target domain 130 that may be better used elsewhere to service users of the target domain 130 that are actually accessing the target domain 130 for the content stored in the data 138, the detection and amelioration of these conflicts may enhance system performance and reduce network traffic on the target domain 130.

Figure 6:
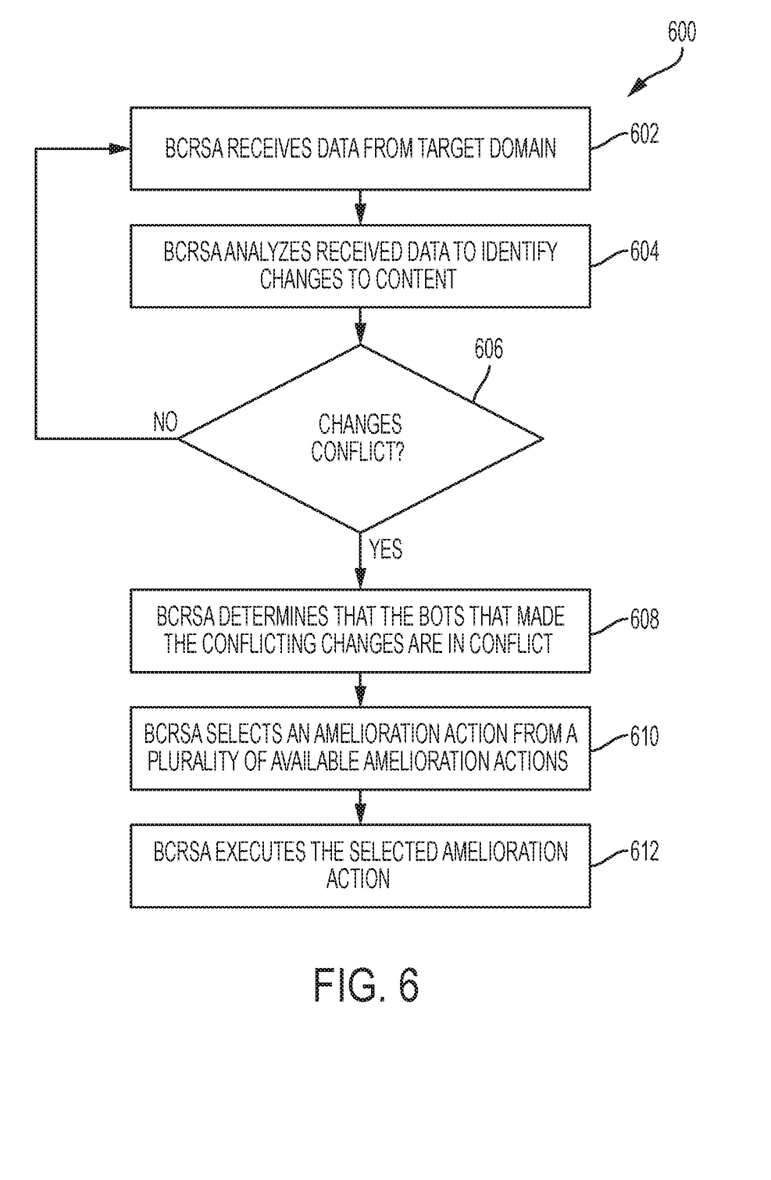
FIG. 6 is a flow chart of a method for in accordance with an aspect of the present disclosure.

With reference now to FIG. 6, a method 600 for resolving a conflict between bots is illustrated. In some aspects, for example, method 600 may be implemented by BCRSA 120 executing on processor 112.

At 602, the BCRSA 120 receives data from a target domain. The data may include changes made to a content of the target domain, e.g., edits to text, the addition or removal of content such as images, pages, text, or other content, or any other content of the target domain as described above. In some aspects, for example, the data may include change logs for a particular piece of content. For example, the change log for a web page may be included in the data that indicates what changes were made to the content, an author of the changes, e.g., a particular bot or user, or any other information that may be relevant to the changes made to the content of the target domain.

At 604, BCRSA 120 analyzes the received data to identify changes to a content of the target domain. For example, BCRSA may determine that a first change was made to the content by a first bot and a second change was made to the content by a second bot. For example, BCRSA 120 may determine that a first bot made changed the word "color" to "colour" and that the second bot changed the word "colour" back to "color".

At 606, the BCRSA 120 determines based on the analysis whether any changes to the content of the target domain conflict. For example, BCRSA may determine whether the first and second changes conflict. In some aspects, for example, if the changes are made to the same piece of content, e.g., the same word, image etc., a conflict may be determined. In some aspects, additional changes may be required to determine a conflict, for example, a threshold number of changes to the same piece of content, e.g., a minimum number of edits and reversions, by the same bots. If none of the changes conflict, BCRSA may returns to 602 and receive additional data from the target domain. In some aspects BCRSA may end if none of the chances conflict.

At 608, if BCRSA determines that there are changes that conflict, e.g., the first and second changes conflict, BCRSA determines that the bots that made the conflicting changes are in conflict, e.g., the first and second bots.

At 610, in response to determining that the bots that made the conflicting changes are in conflict, e.g., the first and second bots are in conflict, BCRSA 120 selects an amelioration action to be executed to resolve the conflict between the bots from a plurality of available amelioration actions, e.g., any of the amelioration actions described above.

At 612, BCRSA resolves the conflict by executing the selected amelioration action.

Figure 7:
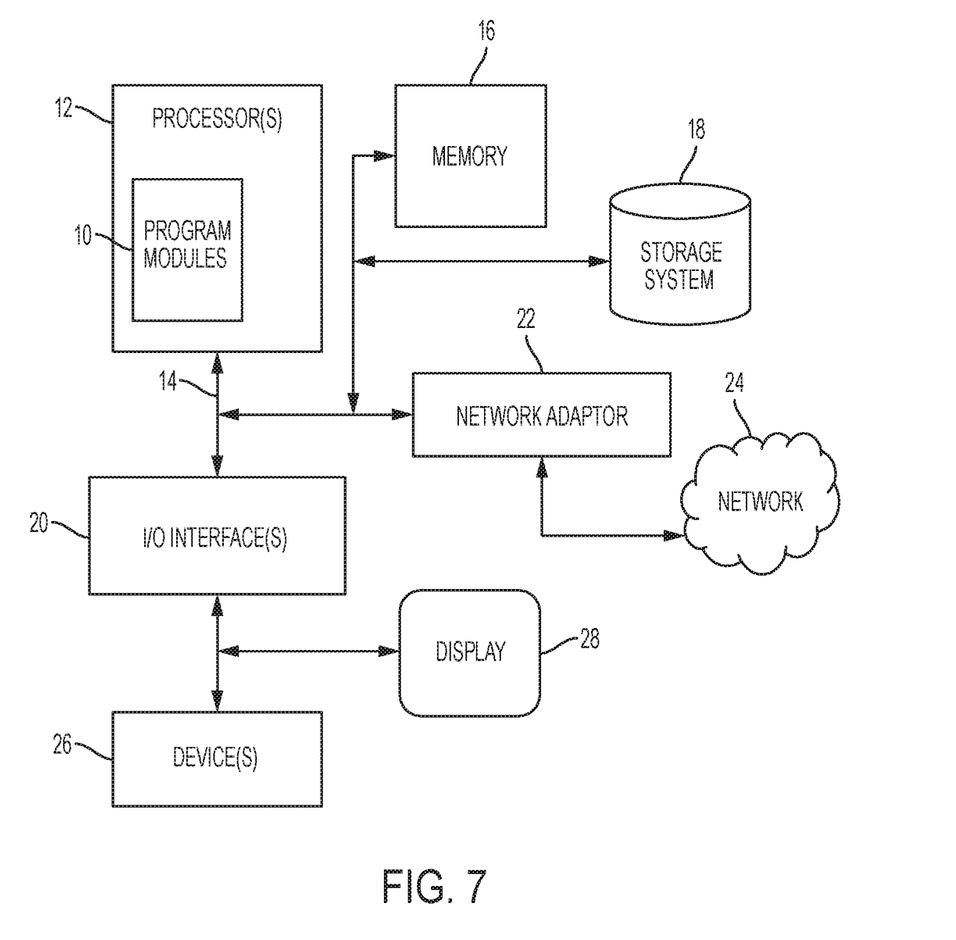
FIG. 7 is an exemplary block diagram of a computer system in which processes involved in the system, method, and computer program product described herein may be implemented.

FIG. 7 illustrates a schematic of an example computer or processing system that may implement any portion of system 100, computing system 110, target domain 130, computing device 150, BCRSA 120, bot 162, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system comprising:
   hardware processor coupled with a memory device, the hardware processor configured to:
      receive data from a target domain, the data comprising changes made to a content of the target domain;
      analyze the data to identify a first change made to the content by a first bot and a second change made to the content by a second bot;
      determine based on the analysis that the first and second changes conflict;
      in response to determining that the first and second changes conflict, determine that the first and second bots are in conflict by determining that the first and second changes are made by the first and second bots automatically, by detecting that the changes made to the content are balanced reverts within a threshold difference and latency between successive reverts are within a threshold of time; and
      resolve the conflict by executing an amelioration action.

2. The system of claim 1, wherein in response to determining that the first and second bots are in conflict, the hardware processor selects the amelioration action to be executed to resolve the conflict between the first and second bots from a plurality of available amelioration actions.

3. The system of claim 2, wherein each of the first and second bots includes a rating and the hardware processor selects the amelioration action from the plurality of available amelioration actions based at least in part on the rating of each of the first and second bots.

4. The system of claim 3, wherein the ratings of each of the first and second bots are determined based on a history of the first and second bots.

5. The system of claim 3, wherein the each rating defines a weighting that is applied to at least one of the plurality of available amelioration actions, and wherein the selection of the amelioration action is based at least in part on the weighting defined by each rating.

6. The system of claim 1, wherein actions of the first bot and the second bot are stored within a blockchain and tracked with the blockchain.

7. A computer readable storage medium storing a program of instructions executable by a machine to perform a method comprising:
   receiving data from a target domain, the data comprising changes made to a content of the target domain;
   analyzing the data to identify a first change made to the content by a first bot and a second change made to the content by a second bot;
   determining based on the analysis that the first and second changes conflict;
   in response to determining that the first and second changes conflict, determining that the first and second bots are in conflict by determining that the first and second changes are made by the first and second bots automatically, by detecting that the changes made to the content are balanced reverts within a threshold difference and latency between successive reverts are within a threshold of time; and
   resolving the conflict by executing an amelioration action.

8. The computer readable storage medium of claim 7, wherein in response to determining that the first and second bots are in conflict, the method further comprising selecting the amelioration action to be executed to resolve the conflict between the first and second bots from a plurality of available amelioration actions.

9. The computer readable storage medium of claim 8, wherein each of the first and second bots includes a rating and the amelioration action is selected from the plurality of available amelioration actions based at least in part on the rating of each of the first and second bots.

10. The computer readable storage medium of claim 9, wherein the ratings of each of the first and second bots are determined based on a history of the first and second bots.

11. The computer readable storage medium of claim 9, wherein the each rating defines a weighting that is applied to at least one of the plurality of available amelioration actions, and wherein the selection of the amelioration action is based at least in part on the weighting defined by each rating.

12. The computer readable storage medium of claim 7, wherein actions of the first bot and the second bot are stored within a blockchain and tracked with the blockchain.

\* \* \* \* \*